(12) United States Patent
Arbel et al.

(10) Patent No.: US 7,948,910 B2
(45) Date of Patent: May 24, 2011

(54) MONITORING QUALITY OF A PACKET FLOW IN PACKET-BASED COMMUNICATION NETWORKS

(75) Inventors: Yuki Arbel, Raanana (IL); Michael Keohane, Shrewsbury, MA (US); Ravid Sagy, Ithack (IL); Oren Shemesh, Gilboa (IL); Clarence Filsfils, Brussels (BE)

(73) Assignee: Cisco Technology, Inc., San Jose, CA (US)

( * ) Notice: Subject to any disclaimer, the term of this patent is extended or adjusted under 35 U.S.C. 154(b) by 112 days.

(21) Appl. No.: 12/043,203

(22) Filed: Mar. 6, 2008

(65) Prior Publication Data

US 2009/0225671 A1    Sep. 10, 2009

(51) Int. Cl.
  *H04L 12/56*    (2006.01)
(52) U.S. Cl. .......................... 370/252; 709/224
(58) Field of Classification Search .......................... None
  See application file for complete search history.

(56) References Cited

U.S. PATENT DOCUMENTS

| | | | |
|---|---|---|---|
| 5,675,741 A | 10/1997 | Aggarwal et al. | 395/200.12 |
| 5,774,837 A | 6/1998 | Yeldener et al. | 704/208 |
| 5,794,183 A | 8/1998 | Müller et al. | 704/222 |
| 6,115,393 A * | 9/2000 | Engel et al. | 370/469 |
| 6,240,386 B1 | 5/2001 | Thyssen et al. | 704/220 |
| 6,275,471 B1 | 8/2001 | Bushmitch et al. | 370/248 |
| 6,442,706 B1 | 8/2002 | Wahl et al. | 714/6 |
| 6,466,574 B1 | 10/2002 | Fujisaki et al. | 370/356 |
| 6,512,746 B1 | 1/2003 | Sand | 370/252 |
| 6,515,967 B1 | 2/2003 | Wei et al. | 370/244 |
| 6,609,153 B1 | 8/2003 | Salkewicz | 709/223 |
| 6,614,781 B1 | 9/2003 | Elliott et al. | 370/352 |
| 6,651,207 B1 | 11/2003 | Dicker et al. | 714/746 |
| 6,681,232 B1 | 1/2004 | Sistanizadeh et al. | 707/104.1 |
| 6,687,225 B1 | 2/2004 | Kawarai et al. | 370/230.1 |
| 6,731,609 B1 | 5/2004 | Hirni et al. | 370/260 |
| 6,741,569 B1 | 5/2004 | Clark | 370/252 |
| 6,760,312 B1 | 7/2004 | Hitzeman | 370/252 |
| 6,771,646 B1 * | 8/2004 | Sarkissian et al. | 370/392 |
| 6,785,735 B2 | 8/2004 | Garakani et al. | |
| 6,801,940 B1 | 10/2004 | Moran et al. | 709/224 |
| 6,804,244 B1 | 10/2004 | Anandakumar et al. | 370/395.21 |
| 6,807,156 B1 | 10/2004 | Veres et al. | |
| 6,823,303 B1 | 11/2004 | Su et al. | 704/220 |
| 6,823,381 B1 | 11/2004 | Harper | |
| 6,856,601 B1 | 2/2005 | Bell et al. | 370/252 |
| 6,975,876 B1 | 12/2005 | Cast et al. | 455/466 |
| 6,985,901 B1 | 1/2006 | Sachse et al. | 707/10 |
| 7,043,237 B2 | 5/2006 | Snyder et al. | 455/425 |
| 7,046,636 B1 | 5/2006 | Shaffer et al. | 370/252 |
| 7,051,098 B2 | 5/2006 | Masters et al. | 709/224 |

(Continued)

OTHER PUBLICATIONS

J. Welch, "A Proposed Media Delivery Index (MDI), rfc4445.text", IETF Standard, Internet Engineering Task Force, Apr. 1, 2006, pp. 1-10.

(Continued)

*Primary Examiner* — Donald L Mills
(74) *Attorney, Agent, or Firm* — Baker Botts L.L.P.

(57) ABSTRACT

A communication system includes multiple routers interconnected by a packet-based communication network. Each of the routers includes a monitoring application that monitors quality of one or more packet flows during each of multiple successive monitoring periods. For each of the packet flows, the monitoring application determines quality metrics based on information obtained from transport headers of packets.

20 Claims, 3 Drawing Sheets

U.S. PATENT DOCUMENTS

| | | | |
|---|---|---|---|
| 7,237,138 B2 | 6/2007 | Greenwald et al. | 714/4 |
| 7,246,101 B2 * | 7/2007 | Fu et al. | 706/46 |
| 7,266,602 B2 * | 9/2007 | Givoly | 709/224 |
| 7,321,565 B2 | 1/2008 | Todd et al. | |
| 2002/0051464 A1 | 5/2002 | Sin et al. | |
| 2002/0097743 A1 | 7/2002 | Baydar et al. | |
| 2002/0178397 A1 | 11/2002 | Ueno et al. | |
| 2003/0033403 A1 | 2/2003 | Rhodes | |
| 2003/0128692 A1 | 7/2003 | Mitsumori et al. | |
| 2003/0149919 A1 | 8/2003 | Greenwald et al. | 714/43 |
| 2004/0078683 A1 | 4/2004 | Buia et al. | 714/37 |
| 2004/0111507 A1 * | 6/2004 | Villado et al. | 709/224 |
| 2004/0136327 A1 | 7/2004 | Sitaraman et al. | |
| 2004/0221198 A1 | 11/2004 | Vecoven | 714/25 |
| 2005/0138111 A1 | 6/2005 | Aton et al. | 709/201 |
| 2006/0034188 A1 | 2/2006 | Oran et al. | 370/254 |
| 2007/0124802 A1 * | 5/2007 | Anton et al. | 726/3 |
| 2007/0286351 A1 | 12/2007 | Ethier et al. | 379/32.01 |
| 2008/0151764 A1 | 6/2008 | Wing et al. | 370/248 |
| 2008/0202420 A1 | 8/2008 | Smith et al. | 118/719 |
| 2009/0028054 A1 | 1/2009 | Kumar et al. | 370/242 |

OTHER PUBLICATIONS

PCT Notification of Transmittal of the International Search Report and the Written Opinion of the International Searching Authority, or the Declaration, May 6, 2009, 15 pages.

SNMP Commands, http://cisco.com/univercd/cc/td/doc/product/mels/15530/command/hcr_snmp.htm, pp. 1-11, Apr. 19, 2006.

S. Chisholm et al., Network Working Group, "Alarm Management Information Base (MIB)," http://www.ietf.org/rfc/rfc3877.txt?number=3877, pp. 1-71, 2004.

T. Friedman et al., Network Working Group, "RTP Control Protocol Extended Reports (RTCP XR)," http://www.rfc-editor.org/rfc/rfc3611.txt, pp. 1-52, 2003.

H. Schulzrinne, Network Working Group, "RTP: A Transport Protocol for Real-Time Applications," http://www.ietf.org/rfc/rfc3550.txt, pp. 1-98, 2003.

Andreasen, et al., "RTP No-Op Payload Format, Internet-Draft," Feb. 2004, pp. 1-8, Internet Engineering Task.

Rosenberg et al., "STUN—Simple Traversal of User Datagram Protocol (UDP) Through Network Address Translators (NATs)," RFC 3489, Mar. 2003, pp. 1-44, Network Working Group.

ISI, USC, "Internet Protocol Darpa Internet Program Protocol Specification," Sep. 1981 (pp. 1-49).

ISI, USC, "Transmission Control Protocol Darpa Internet Program Protocol Specification," Sep. 1981 (pp. 1-88).

ISI, USC, R. Braden, Internet Engineering Task Force, "Requirements for Internet Hosts—Communication Layers," Oct. 1989 (pp. 1-115).

Kumar et al., U.S. Appl. No. 11/782,906, filed Jul. 25, 2007 entitled *Detecting and Isolating Domain Specific Faults*, Communication received from the U.S. Patent and Trademark Office dated Jan. 19, 2010.

USPTO Communication for Ethier et al., U.S. Appl. No. 11/419,913, Office Action from the U.S. Patent and Trademark Office dated Jun. 23, 2010.

USPTO Communication for Kumar et al., U.S. Appl. No. 11/782,906, Final Office Action from the U.S. Patent and Trademark Office dated Jun. 8, 2010.

USPTO Communication for Ethier et al., U.S. Appl. No. 11/419,913, Office Action from the U.S. Patent and Trademark Office dated Dec. 7, 2010.

* cited by examiner

MONITORING QUALITY OF A PACKET FLOW IN PACKET-BASED COMMUNICATION NETWORKS

TECHNICAL FIELD

The present disclosure relates generally to communication systems and, more specifically, to monitoring quality of a packet flow in packet-based communication networks.

BACKGROUND

Packet-based communication networks transmit data, such as audio and video, encapsulated in packets. One use of these networks is to transport video. An example of this use is video on demand, which enables users to select and view streaming video content. Entities such as service providers may derive value from the relative efficiency of their networks as compared to those of their competitors and from their ability to quantify that efficiency.

DESCRIPTION

Overview

In particular embodiments, a method includes receiving multiple packets, making multiple forwarding decisions, and transmitting the packets according to the forwarding decisions; identifying one or more packet flows, each of the packet flows including multiple packets; for each of the packet flows during each of multiple successive monitoring periods, inspecting one or more transport headers of the packets, compiling a quantity metric, and determining one or more quality metrics, the quality metrics for a current monitoring period determined according to a previous difference between the quantity metric and a constant, the constant defined by the amount of packets expected to be consumed by a media presentation application during a monitoring period, for a previous monitoring period and a current difference between the quantity metric and the constant for a current monitoring period; and storing the quality metrics, as discussed below.

BRIEF DESCRIPTION OF THE DRAWINGS

For a more complete understanding of the present disclosure and its advantages, reference is made to the following description, taken in conjunction with the accompanying drawings, in which.

DESCRIPTION OF EXAMPLE EMBODIMENTS

Figure 1:
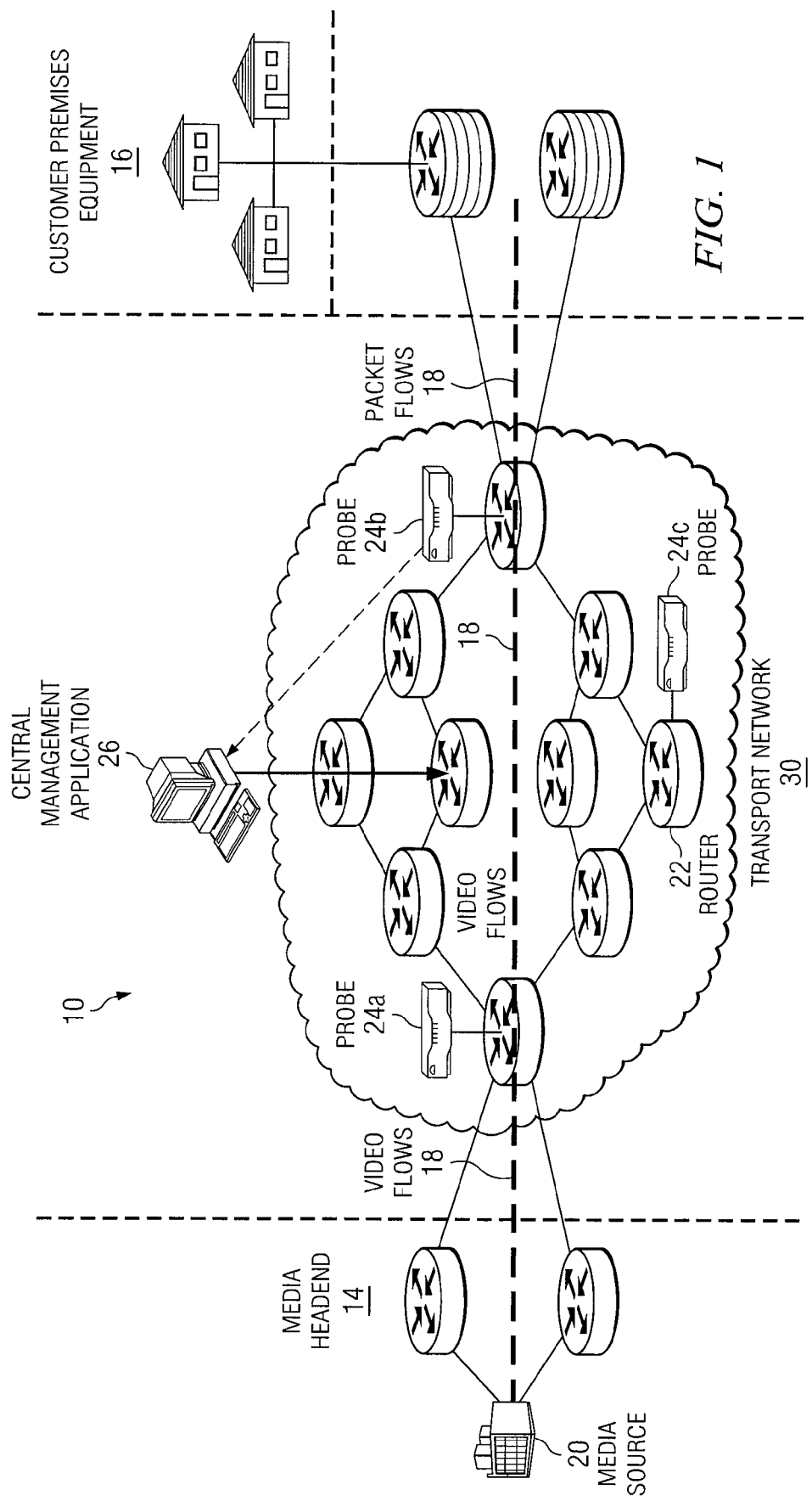
FIG. 1 illustrates a communication system that includes a transport network and multiple routers associated with monitoring quality of a packet flow.

FIG. 1 illustrates a communication system, indicated generally at 10, that includes a plurality of routers 22 interconnected by a packet-based transport network 30 that operates in accordance with various embodiments of the present disclosure. In general, the components of system 10 interoperate to provide transmission of packets between routers 22 and monitoring of the quality of transmission of one or more packet flows 18. While this disclosure addresses a content delivery network example, these techniques may be used for monitoring any type of packet flows.

As illustrated, system 10 includes routers 22, transport network 30, media headend 14, customer premises equipment 16, media source 20, probes 24, and central management application 26. While not illustrated, system 10 may also include any other suitable elements to facilitate transmission of packets or monitoring of packet flows 18.

Routers 22 represent hardware, including any appropriate controlling logic, capable of receiving, routing, and transmitting packets. According to particular embodiments, an entity such as a service provider may utilize routers 22 in conjunction with other network components, such as probes 24, placed strategically throughout system 10 to provide robust end-to-end monitoring of packet flows 18.

In operation, routers 22 receive packets, make forwarding decisions, and transmit the packets according to the forwarding decisions. Some or all routers 22 also identify and monitor one or more packet flows 18. According to particular embodiments, the packet flows 18 are video flows. However, this disclosure is applicable to any suitable type of packet flows 18. Routers 22 can thus monitor quality of transmission of packet flows 18. For each of the packet flows 18 during each of multiple successive monitoring periods, routers 22 inspect one or more transport headers 70 of the packets, compile a quantity metric, and determine one or more quality metrics 28. According to particular embodiments, routers 22 may report the quality metrics 28 to a central management application 26.

Figure 2:
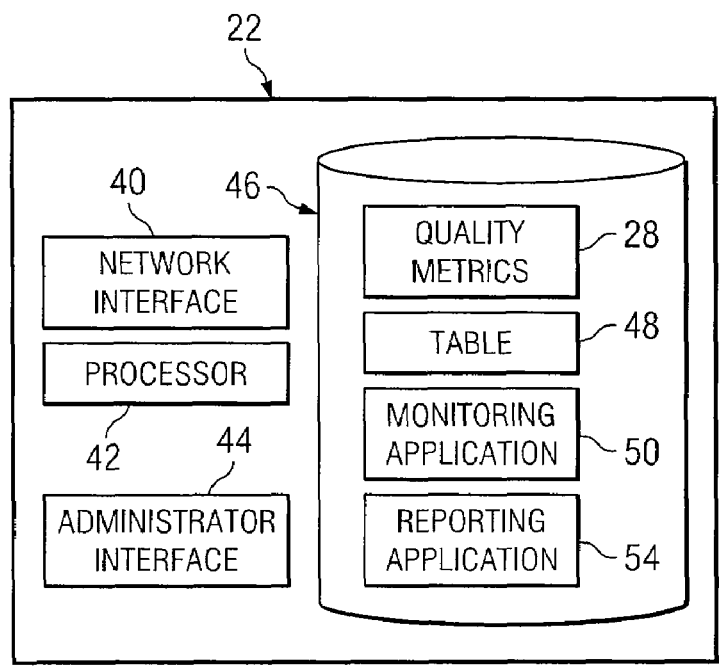
FIG. 2 illustrates a router from the system.

As a specific example of a router 22 from the system 10, consider FIG. 2. The components and operation of routers 22 are discussed in greater detail with respect to FIGS. 2, 3 and 4 below.

System 10, as illustrated, includes transport network 30, which provides packet-based network transport between media headend 14 and customer premises equipment 16. Transport network 30 represents any suitable collection of Local Area Networks (LANs), Wide Area Networks (WANs), or any other type of network that supports packet transport. Media headend 14 includes media source 20 and any other components to facilitate transmission of media, such as audio or video, to a packet-based transport network. Media source 20 may include any type of device that may send or receive data. Customer premises equipment 16 may include, for example, a residential gateway, a set top box, a personal computer, cables, routers, and any other components to facilitate receipt of data from a packet-based transport network. In operation, media source 20, located in media headend 14, provides data to network 30 for delivery to one or more customer premises equipment 16.

As illustrated, system 10 includes deep packet inspection probes 24a, 24b, and 24c. Probes 24 represent hardware, including any appropriate controlling logic, capable of performing deep packet inspection on the packet flows 18. In operation, probes 24 perform deep packet inspection to monitor quality of packet flows 18. Probes 24 may also report to a central management application 26. According to particular embodiments, deep packet inspection includes inspecting Motion Pictures Expert Group (MPEG) Headers 74 or MPEG Payload 72.

In this illustrated embodiment, system 10 also includes a central management application 26. Central management application 26 represents hardware, including any appropriate controlling logic, capable of receiving, compiling, and reporting on the operation of network 30. For example, central management application 26 may be a computer executing appropriate administration applications. In operation, central management application 26 receives reports from routers 22 and/or probes 24. Central management application 26 may also retrieve packet statistics from routers 22, analyze the cause of anomalies, for example, based on packet statistics retrieved from routers, and display reports.

The above description provides an example of a communication system. The example explains particular embodiments and is not all-inclusive. Although system 10 depicts a particular logical configuration of components, system 10 may include any appropriate logical and physical combination, separation, or distribution of the components and their functionality.

FIG. 2 illustrates functional components of an exemplary router 22 from system 10 in accordance with various embodiments of the present disclosure. As illustrated, router 22 includes a network interface 40, a processor 42, an administrator interface 44, a memory 46, a table 48, a monitoring application 50, quality metrics 28, and a reporting application 54. While not illustrated, router 22 may also include any other suitable components to facilitate monitoring of packet flows 18 or transmission of packets. In general, an entity such as a service provider may utilize routers 22 in conjunction with other network components, such as probes 24, placed strategically throughout system 10 to provide robust end-to-end monitoring. According to particular embodiments, routers 22 monitor the quality of transmission of one or more packet flows 18 without impacting actual packet flows, without requiring packet storage, and without requiring deep packet inspection.

Network interface 40 represents hardware, including any appropriate controlling logic, capable of receiving and transmitting packets. In operation, network interface 40 receives packets, makes forwarding decisions, and transmits the packets according to the forwarding decisions.

Administrator interface 44 represents hardware, including any appropriate controlling logic, capable of providing an administrator with access to quality metrics 28. Administrator interface 44 may include software, data, or other applications maintained within memory 46. Administrator interface 44 may also be implemented within or work in conjunction with network interface 40. In operation, administrator interface 44 provides an administrator with access to quality metrics 28.

Memory 46 represents hardware, including any appropriate controlling logic, capable of storing information. As illustrated, memory 46 stores table 48, monitoring application 50, quality metrics 28, and reporting application 54. While not illustrated, memory 46 may store additional information.

In operation, table 48 identifies one or more packet flows 18, which monitoring application 50 may monitor. In particular embodiments, table 48 identifies a particular packet flow 18 according to the transport header 70 addresses of the packets associated with the particular packet flow 18. An operator, user, administrator, or other entity may manually enter transport header 70 addresses into table 48. Alternatively, an entity may automatically enter transport header 70 addresses into table 48, for example, in response to traffic conditions. Using table 48, router 22 can identify particular packet flows to monitor instead of monitoring every packet or every packet flow.

In operation, monitoring application 50, for each packet flow 18 during each of multiple successive monitoring periods, inspects one or more transport headers 70 of the packets, compiles a quantity metric, and determines quality metrics 28 based on the results.

According to particular embodiments, monitoring application 50 inspects one or more transport headers 70. Monitoring application 50 does not necessarily inspect MPEG headers 74 or MPEG payload 72. Monitoring application 50 may thus monitor packet flows 18 even where the MPEG headers 74 or MPEG payload 72 are encrypted.

According to particular embodiments, monitoring application 50 compiles a quantity metric for each packet flow 18 during each of multiple successive monitoring periods. Monitoring application 50 resets the quantity metric at the end of each period. To illustrate compiling a quantity metric, monitoring application 50 aggregates the volume of the packet payloads 82 arriving at a point of measurement that are associated with a particular packet flow 18 upon receiving a packet. As an alternative illustration of compiling a quantity metric, monitoring application 50 measures the amount of packets arriving at a point of measurement that are associated with a particular packet flow 18 upon receiving a packet.

Quality metrics 28 are quantitative measurements indicating quality of a packet flow 18 from media source 20 to customer premises equipment 16. In general, quality metrics 28 are measurements reflecting the operation of the network. According to particular embodiments, quality metrics 28 comprise a media loss rate and a delay factor. In particular embodiments, these metrics may correspond to the Media Delivery Index (MDI) standard, published as RFC 4445. A media loss rate expresses an amount of packets lost during a given monitoring period. There may be a delay in reporting the media loss rate of one monitoring period. The amount of packets lost does not include packets that are recovered during the next monitoring period after the given monitoring period. As a result, the delay in reporting the media loss rate of one monitoring period helps to eliminate false alarms of packet loss. A delay factor is a particular media delivery index that indicates quality of a packet flow 18 from a media source 20 to customer premises equipment 16. A delay factor expresses the delay variation of packet flows 18 at the point of measurement by comparing the maximum packet burst or gap to the expected packet rate.

According to particular embodiments, monitoring application 50 determines quality metrics 28 for each packet flow 18 during each of multiple successive monitoring periods. Monitoring application 50 determines quality metrics 28 for a current monitoring period according to a previous difference between the quantity metric and a constant f or a previous monitoring period and a current difference between the quantity metric and the constant for a current monitoring period. The constant is defined by the amount of packets expected to be consumed by a media presentation application during a monitoring period. In particular embodiments, this constant is defined manually by a theoretical rate of the packet flows. In other embodiments, this constant is defined automatically by auto-learning of an actual rate of the packet flows.

In general, a difference between a quantity metric and a constant for a monitoring period may be positive, zero, or negative. According to particular embodiments, in a packet flow having no anomalies such as delay or packet loss, the difference between a quantity metric and a constant for a monitoring period should not exceed one packet or fall below zero. A situation in which the quantity metric is greater than the constant may be referred to as overrun. A situation in which the quantity metric is less than the constant may be referred to as underrun. If the previous difference is negative and the current difference is positive, a quality metric 28 for the current monitoring period is defined by the lesser of the sum of the previous difference and the current difference or zero, and the next difference for the next monitoring period is defined by the greater of the sum of the previous difference and the current difference or zero. This scenario depends upon whether a current overrun cancels a previous underrun. If the previous difference is positive and the current difference is negative, a quality metric 28 for the current monitoring period is defined by the greater of the sum of the previous difference and the current difference or zero, and the next difference for the next monitoring period is defined by the lesser of the sum of the previous difference and the current difference or zero. This scenario depends upon whether a previous overrun cancels a current underrun. If either the previous difference or the current difference is zero, the quality metric 28 for the current monitoring period is defined by the previous difference, and the next difference for the next monitoring period is defined by the current difference. If a previous difference is zero, then the previous difference does not influence the current difference, and thus the previous difference is reported as the quality metric 28 for the current monitoring period with a delay of one period. If a current difference is zero, then the current difference will not influence the next difference for the next monitoring period, and thus the quality metric for the next monitoring period will be zero. If both the previous difference and the current difference are negative or if both the previous difference and the current difference are positive, the quality metric 28 for the current monitoring period is defined by the previous difference, and the next difference for the next monitoring period is defined by the current difference. The current difference confirms the previous difference, and thus no packets, if any, that were lost during the previous monitoring period were recovered during the current monitoring period.

The above description provides an example of a router capable of transport-level monitoring of packet flows. The example explains particular embodiments and is not all-inclusive. Moreover, while router 22 is illustrated having a particular logical configuration of components, router 22 may include any appropriate logical and physical combination, separation, or distribution of components to provide the described functionality.

Figure 3:
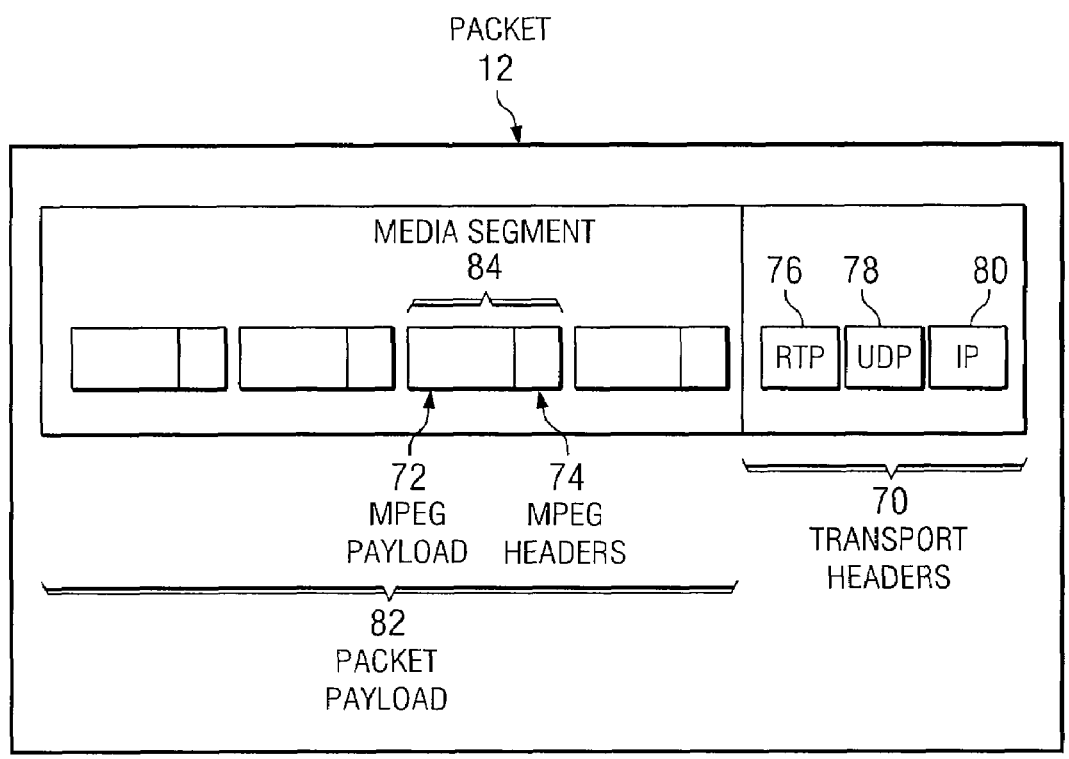
FIG. 3 illustrates a packet that the router may transport.

FIG. 3 illustrates a packet 12 that router 22 may inspect in accordance with various embodiments of the present disclosure. As illustrated, packet 12 includes transport headers 70 and media segments 84.

In the illustrated embodiment, media segment 84 includes an MPEG payload 72 and MPEG headers 74. MPEG refers to a standard for quality video transmission developed by the Motion Pictures Expert Group (MPEG). The International Standards Organization (ISO) catalogues the set of MPEG standards as ISO 13818. However, MPEG compliant packets merely represent one example of a particular streaming media transmission protocol. Other protocols may be used. Multiple media segments 84 can be combined into a single packet for efficient transmission onto a packet-based network. In one example, the single packet is a Real-Time Transport Protocol (RTP) packet.

As illustrated, transport headers 70 include RTP header 76, User Datagram Protocol (UDP) header 78, and Internet Protocol (IP) header 80. According to particular embodiments, an RTP packet is encapsulated within a UDP packet by placing it in the data portion of the UDP packet. A UDP packet is encapsulated within an IP packet by placing it in the data portion of the IP packet. While RTP refers to a particular media transport protocol, any media transport protocol may be used. While UDP refers to a particular transport layer protocol, any transport layer protocol may be used. While IP refers to a particular network layer protocol, any network layer protocol may be used.

According to particular embodiments, packet flows 18 may be in the form of constant MPEG payload delivery. Constant MPEG payload delivery comprises MPEG payloads that are padded as needed to achieve a constant size. The size of MPEG payloads may refer to the size of elementary streams, multi-program streams, and single program transport streams that are encapsulated in MPEG compliant media segments. Also, the size of the packets 12 is constant. Techniques such as bit stuffing are used to ensure that the size of the packets 12 is constant. Alternatively, packet flows 18 may be in the form of capped variable MPEG payload delivery. Capped variable MPEG payload delivery comprises MPEG payloads that vary in size up to a given variance. However, the size of the packets 12 is constant. As an additional alternative, packet flows 18 may be in the form of clamped variable MPEG payload delivery. Clamped variable MPEG payload delivery comprises MPEG payloads that vary in size. Bits that are not needed are not encoded. However, the size of the packets 12 is constant.

The above description provides an example of a packet. The example explains particular embodiments and is not all-inclusive. Elements of system 10 may operate on packets having any appropriate form and contents.

Figure 4:
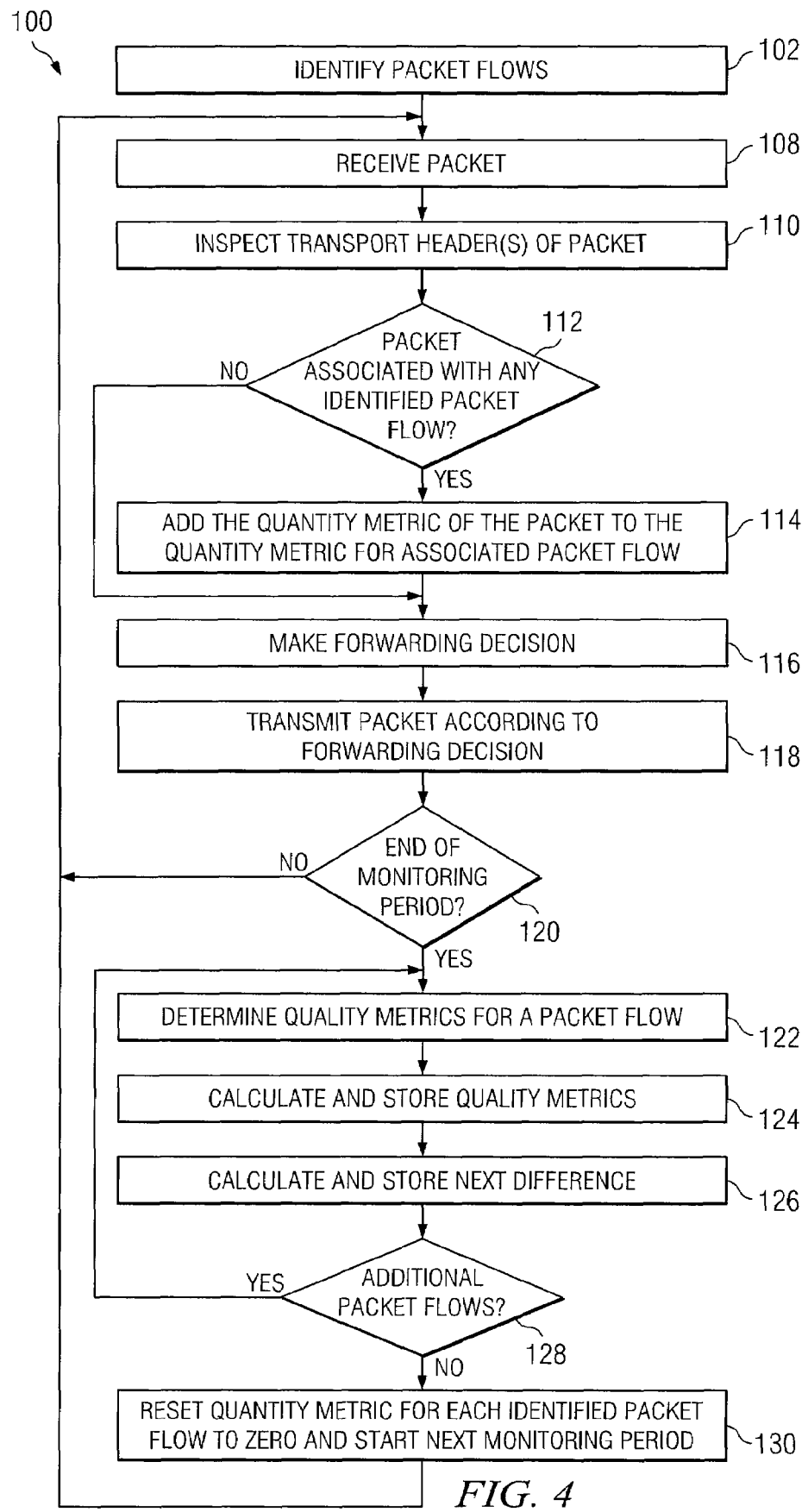
FIG. 4 is a flowchart illustrating a method for monitoring quality of a packet flow.

FIG. 4 is a flowchart illustrating a method, indicated generally at 100, for monitoring quality metrics 28 of a packet flow 18 in accordance with various embodiments of the present disclosure. As illustrated, method 100 shows the steps involved for router 22 to monitor quality of packet flows 18 in a packet-based network.

According to particular embodiments, at step 102, router 22 identifies packet flows 18 according to table 48. At step 108, router 22 receives a packet. At step 110, monitoring application 50 inspects one or more transport headers 70 of the packet. As previously discussed, this operation can be performed relatively quickly, with little or no disruption to packet flows 18. At step 112, monitoring application 50 determines whether the packet is associated with any identified packet flows 18 in table 48. If the packet is associated with an identified packet flow 18, monitoring application 50, at step 114, adds quantity metric of the packet to the quantity metric for the associated packet flow 18. At step 116, router 22 makes a forwarding decision for the packet, and, at step 118, router 22 transmits the packet according to the forwarding decision. At step 120, monitoring application 50 determines whether the monitoring period has ended. If the monitoring period has not ended, monitoring application 50 repeats steps 108 through 120.

If the monitoring period has ended, monitoring application 50, at step 122, determines one or more quality metrics 28 for each packet flow 18. For example, quality metrics 28 may include a media loss rate, which is defined by an amount of packets lost during a monitoring period. The quality metrics 28 for a current monitoring period are determined according to a previous difference between the quantity metric and a constant for a previous monitoring period and a current difference between the quantity metric and the constant for a current monitoring period. The constant is defined by the amount of packets expected to be consumed by a media presentation application during a monitoring period. According to particular embodiments, the difference between a quantity metric and a constant for a monitoring period may be positive, zero, or negative. In addition, the constant may be defined either manually by a theoretical rate of the packet flows 18 or automatically by auto-learning of an actual rate of the packet flows 18.

At step 124, monitoring application 50 calculates and stores the quality metric(s) 28. At step 126, monitoring application 50 calculates and stores the next difference. According to particular embodiments, if the previous difference is negative and the current difference is positive, a quality metric 28 for the current monitoring period is defined by the lesser of the sum of the previous difference and the current difference or zero, and the next difference for the next monitoring period is defined by the greater of the sum of the previous difference and the current difference or zero. If the previous difference is positive and the current difference is negative, a quality metric 28 for the current monitoring period is defined by the greater of the sum of the previous difference and the current difference or zero, and the next difference for the next monitoring period is defined by the lesser of the sum of the previous difference and the current difference or zero. If either the previous difference or the current difference is zero, the quality metric 28 for the current monitoring period is defined by the previous difference, and the next difference for the next monitoring period is defined by the current difference. If both the previous difference and the current difference are negative or if both the previous difference and the current difference are positive, the quality metric 28 for the current monitoring period is defined by the previous difference, and the next difference for the next monitoring period is defined by the current difference. According to particular embodiments, the method of claim 15 may also include reporting, for each of the packet flows 18 during each of the successive monitoring periods, the quality metrics 28 to a central management application.

At step 128, monitoring application 50 determines whether there are additional identified packet flows 18 having a measured quantity metric for which the monitoring application 50 has not determined quality metrics 28. If there are additional packet flows 18, monitoring application 50 repeats steps 122 through 128 for the additional packet flow 18. If there are no additional packet flows 18, at step 130, monitoring application 50 resets the quantity metric for each identified packet flow to zero, starts a next monitoring period, and repeats steps 108 through 130 for the next monitoring period.

The method described with respect to FIG. 4 is merely illustrative. The manner of operation and devices indicated as performing the operations may be modified in any appropriate manner. While the method describes particular steps performed in a specific order, system 10 contemplates any suitable collection and arrangement of elements performing some, all, or none of these steps in any operable order.

Since the present disclosure describes particular embodiments and suggests numerous alterations to one skilled in the art, the present disclosure encompasses all embodiments and alterations within the scope of the appended claims.

What is claimed is:

1. A system comprising:
    a plurality of routers interconnected by a packet-based network, at least one of the routers comprising:
        a network interface, the network interface operable to receive a plurality of packets, make a plurality of forwarding decisions, and transmit the packets according to the forwarding decisions;
        a table identifying two or more packet flows, each of the packet flows comprising a plurality of packets;
        a monitoring application, the monitoring application configured, for each of the packet flows during each of a plurality of successive monitoring periods following an initial monitoring period, to inspect one or more transport headers of the packets, compile a quantity metric, and determine one or more quality metrics, the quality metrics for a current monitoring period determined according to a previous difference between the quantity metric and a constant, the constant defined by the amount of packets expected to be consumed by a media presentation application during a monitoring period, for a previous monitoring period and a current difference between the quantity metric and the constant for a current monitoring period; and
        a memory for storing the quality metrics.

2. The system of claim 1, further comprising a plurality of deep packet inspection probes.

3. The system of claim 1, wherein a difference between a quantity metric and a constant for a monitoring period is positive, zero, or negative.

4. The system of claim 3, wherein if the previous difference is negative and the current difference is positive, a quality metric for the current monitoring period is defined by the lesser of the sum of the previous difference and the current difference or zero, and the next difference for the next monitoring period is defined by the greater of the sum of the previous difference and the current difference or zero;
    if the previous difference is positive and the current difference is negative, a quality metric for the current monitoring period is defined by the greater of the sum of the previous difference and the current difference or zero, and the next difference for the next monitoring period is defined by the lesser of the sum of the previous difference and the current difference or zero;
    if either the previous difference or the current difference is zero, the quality metric for the current monitoring period is defined by the previous difference, and the next difference for the next monitoring period is defined by the current difference; and
    if both the previous difference and the current difference are negative or if both the previous difference and the current difference are positive, the quality metric for the current monitoring period is defined by the previous difference, and the next difference for the next monitoring period is defined by the current difference.

5. The system of claim 1, further comprising a central management application, the central management application operable to receive one or more reports from the routers.

6. The system of claim 1, wherein the quality metrics comprise a media loss rate, the media loss rate defined by an amount of packets lost during a monitoring period.

7. The system of claim 1, wherein the constant is defined either manually by a theoretical rate of the packet flows or automatically by auto-learning of an actual rate of the packet flows.

8. An apparatus comprising:
    a network interface, the network interface operable to receive a plurality of packets, make a plurality of forwarding decisions, and transmit the packets according to the forwarding decisions;
    a table identifying two or more packet flows, each of the packet flows comprising a plurality of packets;
    a monitoring application, the monitoring application configured, for each of the packet flows during each of a plurality of successive monitoring periods following an initial monitoring period, to inspect one or more transport headers of the packets, compile a quantity metric, and determine one or more quality metrics, the quality metrics for a current monitoring period determined according to a previous difference between the quantity metric and a constant, the constant defined by the amount of packets expected to be consumed by a media presentation application during a monitoring period, for a previous monitoring period and a current difference between the quantity metric and the constant for a current monitoring period; and
    a memory for storing the quality metrics.

9. The apparatus of claim 8, wherein a difference between a quantity metric and a constant for a monitoring period is positive, zero, or negative.

10. The apparatus of claim 9, wherein if the previous difference is negative and the current difference is positive, a quality metric for the current monitoring period is defined by the lesser of the sum of the previous difference and the current difference or zero, and the next difference for the next monitoring period is defined by the greater of the sum of the previous difference and the current difference or zero;
  if the previous difference is positive and the current difference is negative, a quality metric for the current monitoring period is defined by the greater of the sum of the previous difference and the current difference or zero, and the next difference for the next monitoring period is defined by the lesser of the sum of the previous difference and the current difference or zero;
  if either the previous difference or the current difference is zero, the quality metric for the current monitoring period is defined by the previous difference, and the next difference for the next monitoring period is defined by the current difference; and
  if both the previous difference and the current difference are negative or if both the previous difference and the current difference are positive, the quality metric for the current monitoring period is defined by the previous difference, and the next difference for the next monitoring period is defined by the current difference.

11. The apparatus of claim 8, wherein the constant is defined either manually by a theoretical rate of the packet flows or automatically by auto-learning of an actual rate of the packet flows.

12. The apparatus of claim 8, further comprising a reporting application, the reporting application operable to report, for each of the packet flows during each of the successive monitoring periods, one or more quality metrics to a central management application.

13. The apparatus of claim 8, further comprising an administrator interface, the administrator interface operable to provide an administrator with access to the quality metrics.

14. The apparatus of claim 8, wherein the quality metrics comprise a media loss rate, the media loss rate defined by an amount of packets lost during a monitoring period.

15. A method comprising:
  receiving a plurality of packets, making a plurality of forwarding decisions, and transmitting the packets according to the forwarding decisions;
  identifying two or more packet flows, each of the packet flows comprising a plurality of packets;
  for each of the packet flows during each of a plurality of successive monitoring periods following an initial monitoring period, using a processor to perform the steps of inspecting one or more transport headers of the packets, compiling a quantity metric, and determining one or more quality metrics, the quality metrics for a current monitoring period determined according to a previous difference between the quantity metric and a constant, the constant defined by the amount of packets expected to be consumed by a media presentation application during a monitoring period, for a previous monitoring period and a current difference between the quantity metric and the constant for a current monitoring period; and
  storing the quality metrics.

16. The method of claim 15, wherein a difference between a quantity metric and a constant for a monitoring period is positive, zero, or negative.

17. The method of claim 16, wherein if the previous difference is negative and the current difference is positive, a quality metric for the current monitoring period is defined by the lesser of the sum of the previous difference and the current difference or zero, and the next difference for the next monitoring period is defined by the greater of the sum of the previous difference and the current difference or zero;
  if the previous difference is positive and the current difference is negative, a quality metric for the current monitoring period is defined by the greater of the sum of the previous difference and the current difference or zero, and the next difference for the next monitoring period is defined by the lesser of the sum of the previous difference and the current difference or zero;
  if either the previous difference or the current difference is zero, the quality metric for the current monitoring period is defined by the previous difference, and the next difference for the next monitoring period is defined by the current difference; and
  if both the previous difference and the current difference are negative or if both the previous difference and the current difference are positive, the quality metric for the current monitoring period is defined by the previous difference, and the next difference for the next monitoring period is defined by the current difference.

18. The method of claim 15, wherein the constant is defined either manually by a theoretical rate of the packet flows or automatically by auto-learning of an actual rate of the packet flows.

19. The method of claim 15, further comprising reporting, for each of the packet flows during each of the successive monitoring periods, the quality metrics to a central management application.

20. The method of claim 15, wherein the quality metrics comprise a media loss rate, the media loss rate defined by an amount of packets lost during a monitoring period.

* * * * *